United States Patent
Erbe (10) Patent No.: US 10,775,615 B2
(45) Date of Patent: Sep. 15, 2020

(54) DEVICE FOR VARIABLY INFLUENCING THE WAVEFRONT OF A BEAM, SAID DEVICE COMPRISING A PLANAR OPTICAL ELEMENT DEFORMABLE VIA ITS PERIPHERAL SURFACE

(71) Applicant: JENOPTIK Optical Systems GmbH, Jena (DE)

(72) Inventor: Torsten Erbe, Jena (DE)

(73) Assignee: JENOPTIK Optical Systems GmbH, Jena (DE)

( * ) Notice: Subject to any disclaimer, the term of this patent is extended or adjusted under 35 U.S.C. 154(b) by 270 days.

(21) Appl. No.: 16/049,383

(22) Filed: Jul. 30, 2018

(65) Prior Publication Data

US 2019/0041632 A1 Feb. 7, 2019

(30) Foreign Application Priority Data

Aug. 2, 2017 (DE) .................. 10 2017 117 468

(51) Int. Cl.
*G02B 27/00* (2006.01)
*G02B 7/182* (2006.01)
*G02B 26/06* (2006.01)

(52) U.S. Cl.
CPC ......... *G02B 27/0068* (2013.01); *G02B 7/182* (2013.01); *G02B 26/06* (2013.01)

(58) Field of Classification Search
CPC . F02D 41/1483; G02B 26/06; G02B 27/0068; G02B 7/182
See application file for complete search history.

(56) References Cited

U.S. PATENT DOCUMENTS

| 3,601,343 | A | 8/1971 | Sivaslian |
| 5,357,825 | A * | 10/1994 | Costello ................. G02B 26/06 |
| | | | 74/490.07 |
| 7,229,178 | B1 | 6/2007 | Headley et al. |
| 2003/0030922 | A1 * | 2/2003 | Menck ............... G02B 26/0825 |
| | | | 359/846 |

(Continued)

FOREIGN PATENT DOCUMENTS

| DE | 19628672 C2 | 7/1999 |
| DE | 19827603 A1 | 12/1999 |

(Continued)

*Primary Examiner* — Joseph P Martinez
*Assistant Examiner* — Vipin Patel
(74) *Attorney, Agent, or Firm* — Patentbar International, P.C.

(57) ABSTRACT

A device for variably influencing the wavefront of a beam, said device comprising a reflecting or transmitting planar optical element (1) and an actuating and holding means (2) which is connected to the planar optical element (1) via at least three elastic retaining lugs (2.3) such that forces can be introduced into at least one of the retaining lugs (2.3) via at least one actuating element (2.4) arranged in the actuating and holding means (2), which forces are deflected in their direction of action by the bending of the retaining lugs (2.3) such that they cause forces on the peripheral surface (1.3) of the planar optical element (1) whose direction of action ($R_A$) is parallel to the axis of symmetry (A) of the planar optical element (1), allowing the planar optical element (1) to be actively deformed.

7 Claims, 7 Drawing Sheets

(56) References Cited

U.S. PATENT DOCUMENTS

2007/0030573 A1\* 2/2007 Batchko ................ B33Y 80/00
359/665
2012/0275041 A1 11/2012 Laslandes et al.
2013/0070355 A1\* 3/2013 Hugot ................ G02B 26/0825
359/849

FOREIGN PATENT DOCUMENTS

DE 60116322 T2 6/2006
DE 102007010906 A1 9/2008
DE 102012209309 A1 12/2013

\* cited by examiner

DEVICE FOR VARIABLY INFLUENCING THE WAVEFRONT OF A BEAM, SAID DEVICE COMPRISING A PLANAR OPTICAL ELEMENT DEFORMABLE VIA ITS PERIPHERAL SURFACE

RELATED APPLICATIONS

This application claims priority to German Patent Application No. DE 10 2017 117 468.0, filed Aug. 2, 2017, which is incorporated herein by reference in its entirety.

FIELD OF THE INVENTION

The invention relates to a device comprising a planar optical element and an actuating and holding means, in which the planar optical element is held and its optically effective surface is actively deformable by actuation of actuating elements of the actuating and holding means. Using such a device, an impinging beam can be influenced so as to compensate for imaging errors (aberrations) of the beam, which are caused by one or more optical elements of an optical system and which can be detected, on the whole, as wavefront errors.

BACKGROUND OF THE INVENTION

Wavefront errors can be described and represented mathematically, for instance, by the so-called Zernike polynomials. They are detectable, for example, by wavefront aberrometers. In this case, the wavefront errors may be caused by individual imaging errors or by superposition of different imaging errors of single or multiple optical elements of an optical system. In many cases, individual optical elements have a dominant influence on the relevant imaging errors of an optical system, and the wavefront deformation caused thereby has a typical appearance, which can be countered by active deformation of the surface of one of the optical elements or, for example, of a mirror additionally arranged in the system for this purpose.

In order to counter imaging errors, a large number of solutions are known from the prior art which use active surface deformation of a planar optical element, usually a mirror. They differ substantially in the location where an actuating means acts on the planar optical element and where, accordingly, forces are applied into the planar optical element. In some of these solutions, forces are applied on the peripheral surface of the planar optical element or in the edge region adjacent to the peripheral surface. Only such solutions will be considered below.

Using a correction device in accordance with US 2012/0275041 A1, an imaging error of known evolution can be corrected within an optical instrument. For this purpose, a deformable mirror is introduced into the optical path of the arrangement, along which beams of electromagnetic radiation propagate. Forces are applied to the peripheral edge of the deformable mirror and introduced into the mirror such that the latter is deformed as a function of its contour as well as the location of force introduction and the vectors (amount, direction) of the forces introduced. The deformation of the mirror caused thereby and the resulting local change in the reflection behavior, as a consequence of optical path differences, enable correction of any wavefront errors occurring.

Specifically, the aforementioned US 2012/0275041 A1 proposes to select the contour of the mirror as a function of the imaging error to be corrected, e.g. round so as to correct the focus position, or elliptical so as to correct the focus position and astigmatism. Despite the same forces acting on the perimeter, this allows locally differing flexing moments to be applied to the surface, depending on the distance of the force application from the center of the mirror. It is proposed therein that, as a means of force application, an intermediate plate having the same contour as the mirror be connected to the peripheral edge of the mirror by a ring and that a force be introduced centrally into the intermediate plate, e.g. by means of a piezo actuator, said force then acting on the periphery of the mirror. In order to differentiate the force effect along the periphery of the mirror, it is proposed to design the intermediate plate differentially in thickness or/and to introduce the forces eccentrically into the intermediate plate. This solution allows different flexing moments to be generated in the mirror along the periphery. However, the ratio of the flexing moments with respect to each other is predetermined by the design of the contour of the mirror and is thus no longer variable.

U.S. Pat. No. 7,229,178 B1 discloses a deformable mirror whose circular or oval mirror plate can be bent parabolically via an internal (smaller) and an external (larger) annular support. For this purpose, the mirror is placed between the annular support. The required force is introduced by a mechanical actuating element. The actuating element acts directly or indirectly, via a lever, on the annular supports. Force introduction via the level and parallel annular supports is always effected centrally with respect to the axis of symmetry of the mirror. This merely allows the parameters of a paraboloid surface to be influenced. Again, no locally differentiated application of force is possible.

In a device known from DE 601 16 322 322 T2, aberrations are also compensated for by application of force onto a mirror. For the application of force, there are provided at least one active actuating element and two so-called force transmission rods. The force transmission rods each have their ends connected to the mirror via a respective deformation element, thereby applying the same force into the mirror at different points. A differentiated application of force at different points is not possible.

DE 196 28 672 C2 discloses a mirror comprising a deformable mirror plate held by its edge as well as comprising an actuating mechanism acting on the rear surface of the mirror plate, said actuating mechanism comprising a plurality of springs connected in parallel, which act on the rear surface of the mirror plate, and comprising an actuating means for adjustment of the spring force. In this case, a force is applied into the center of the mirror and into eccentric points of action which are arranged in radially opposite pairs. The introduction of force can be adjusted only jointly for all points of action.

DE 10 2007 010 906 A1 proposes a device with an actuating means, comprising at least one main actuator which acts on the peripheral surface of an optical element. In one embodiment, a bending moment is introduced into the optical element, with the axis of the bending moment being perpendicular to the optical axis and perpendicular to a radial direction. In the case of only one main actuator, the optical element is fixed on the opposite side in the axial direction. Advantageously, main actuators are provided on two opposite sides with respect to the optical axis, each of said main actuators introducing a respective bending moment into the optical element. As a main actuator, an electrodynamic drive is proposed. In particular, an electromagnetic plunger coil drive is supposed to be suitable to introduce high forces with great accuracy of repetition and great positioning accuracy so as to bend the optical element in a very accurate and reproducible manner. The device is suitable, in particular for dynamic correction of wavefront errors, for example those of a holographic projection device, and are not suitable for static correction.

U.S. Pat. No. 3,601,343 A discloses a mount for strain-free support of an element with an expansion coefficient that differs from that of the mount. The mount consists of a rigid annular body having a plurality of flexible support arms formed thereon in an axial direction of the mount, which grip the element to be supported at their free ends. The mount merely allows a radial movement and thus unhindered, different expansion of the mount and the element in a radial direction.

DE 198 27 603 A1 discloses, in connection with a projection lighting system of microlithography, a mount in which an optical element is arranged, and actuators which act on the optical element perpendicular to the optical axis. The actuators are designed to cause flexing of the optical element without substantial changes in thickness.

DE 10 2012 209 309 A1 discloses a lithography system comprising at least one mirror assembly. A mirror assembly of lithography systems comprises mirrors with a large diameter, which makes low-deformation support and actuation difficult. According to the aforementioned DE 10 2012 209 309 A1, the mirror is formed from a mirror substrate, whose front surface is provided with a reflective surface, and an annular side wall, said mirror substrate and said side wall limiting a hollow space, resulting in the mirror having a comparatively low weight. The mirror is supported, actively or passively, on a structural element of the lithography system by a plurality of supporting elements via the side wall. This results in deformation being uncoupled to a large extent to the reflective surface of the mirror.

SUMMARY OF THE INVENTION

It is the object of the invention to find a device comprising a deformable planar optical element to compensate for aberrations, said device allowing locally differentiated and very precise application of force on the peripheral surface of the planar optical element.

The object is achieved by a device as claimed in claim 1.

Advantageous embodiments are indicated in subclaims 2 to 7 which refer back to claim 1.

It is essential to the invention that at least three retaining lugs are fixed to the planar optical element to be deformed, which are distributed over the peripheral surface. By bending at least one of the retaining lugs perpendicular to its longitudinal axis and, thus, perpendicular to the axis of symmetry of the planar optical element, after mounting the device, a force is applied into the planar optical element, in the direction of the axis of symmetry toward the support on the peripheral surface of the planar optical element. One force may be applied by all retaining lugs if the planar optical element is centrally supported on a supporting surface of the support so that the support acts as an abutment.

If the planar optical element is not a mirror but a transparent planar plate, it cannot be centrally supported by a supporting surface; therefore, in this case, the function of the abutment is assumed by at least one of the retaining lugs. Said retaining lug is then either not bent when producing the desired deformation of the planar optical element, so that said retaining lug, due to its stiffness, generates a counterforce on the peripheral surface, in the direction of the longitudinal axis, or it was pre-stressed before being mounted, so that an increased counterforce can be generated by reducing the pre-stress. In this case, a displacement or tilt is accepted which, although not a deformation, has an effect on the image, which may be additionally compensated for, if necessary, by the deformation.

BRIEF DESCRIPTION OF THE DRAWINGS

The invention will be explained in more detail below with reference to exemplary embodiments and drawings. In the Figures.

DETAILED DESCRIPTION OF THE PREFERRED EMBODIMENTS

Figure 1A:
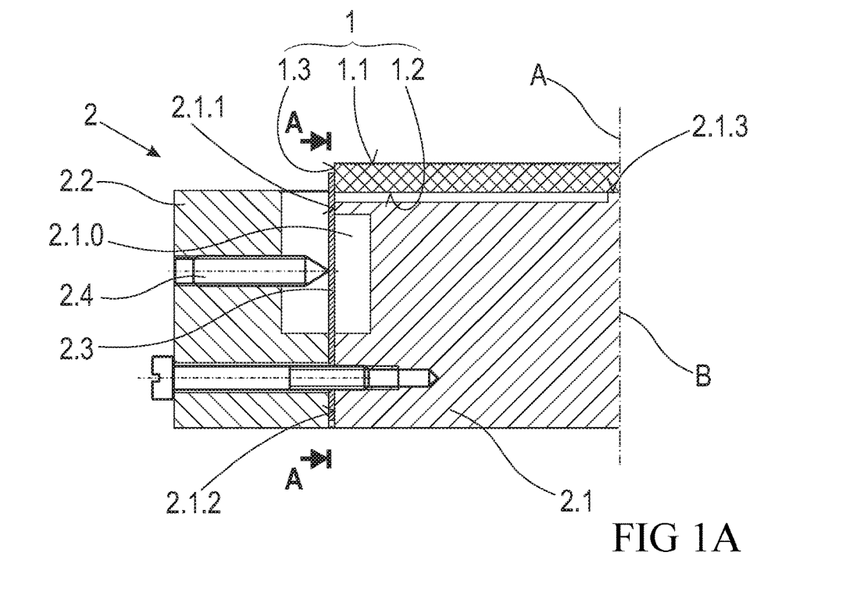
FIG. 1A shows a first schematic diagram of a device comprising a mirror in a sectional view.
Figure 1B:
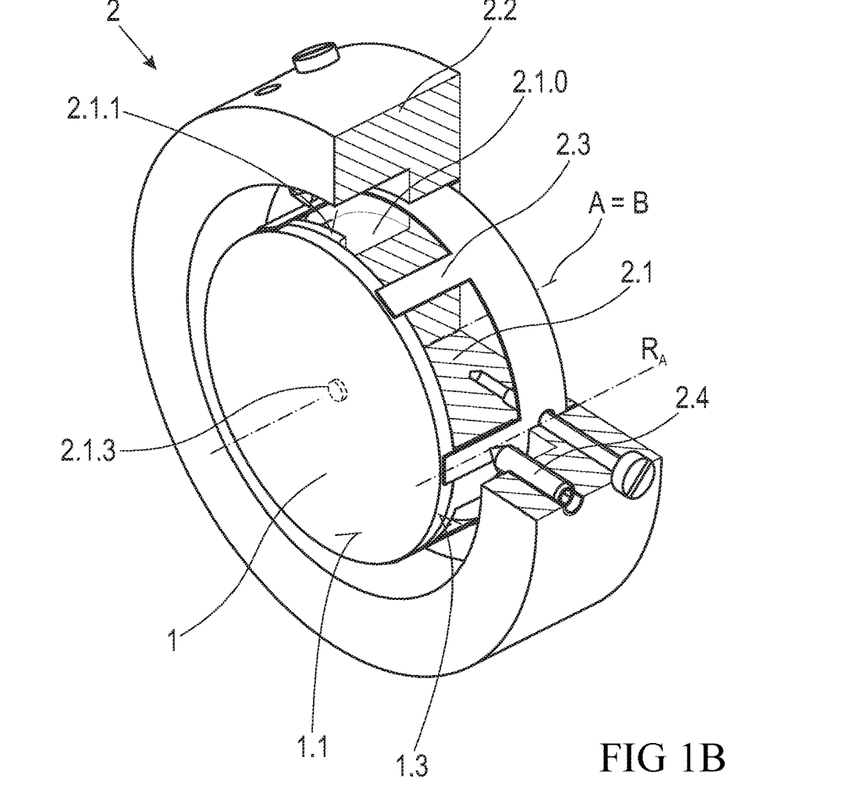
FIG. 1B shows a device according to FIG. 1a in a perspective view.
Figure 2A:
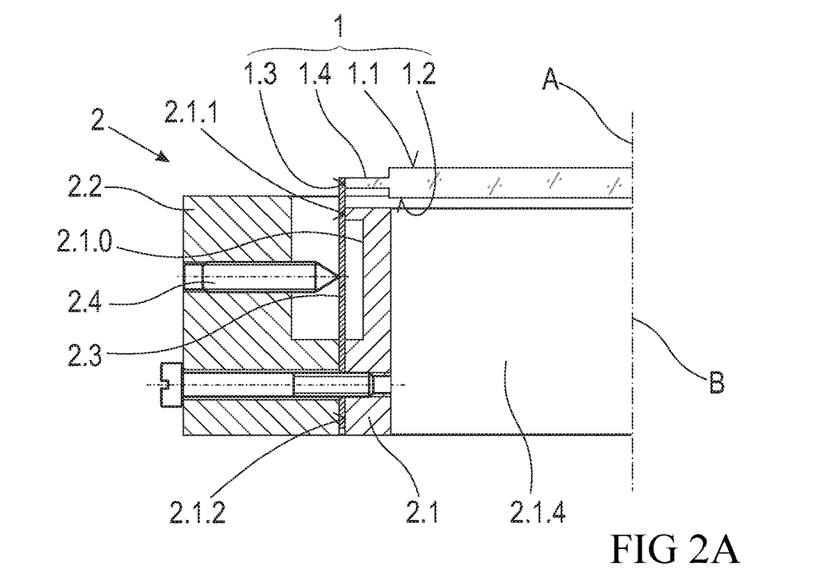
FIG. 2A shows a second schematic diagram of a device comprising a planar plate in a sectional view.
Figure 2B:
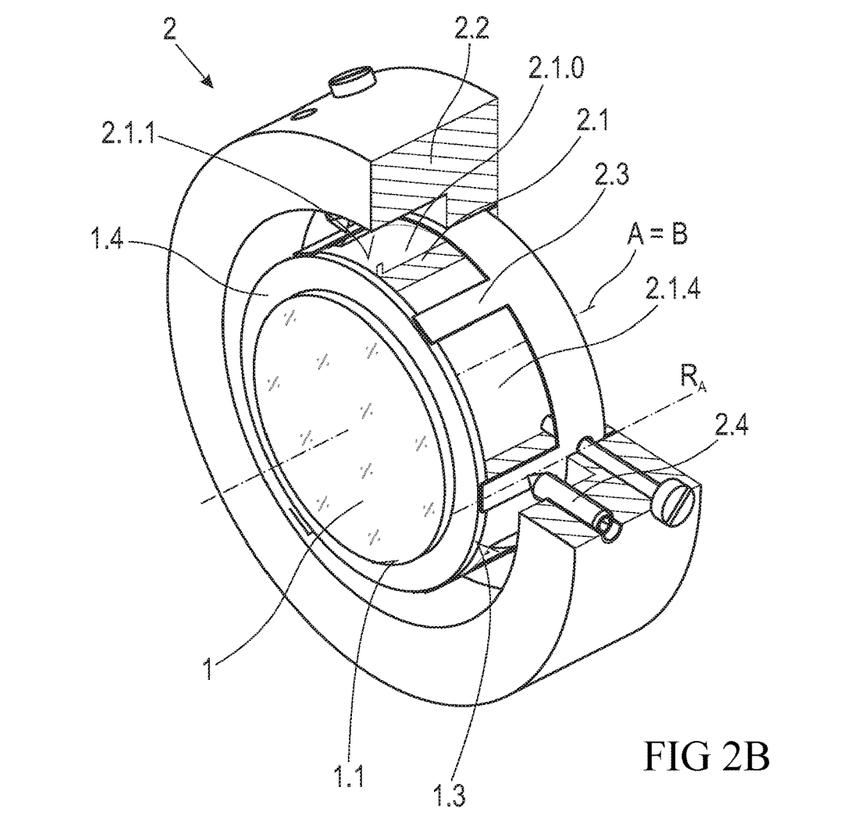
FIG. 2B shows a device according to FIG. 2A in a perspective view.
Figure 3A:
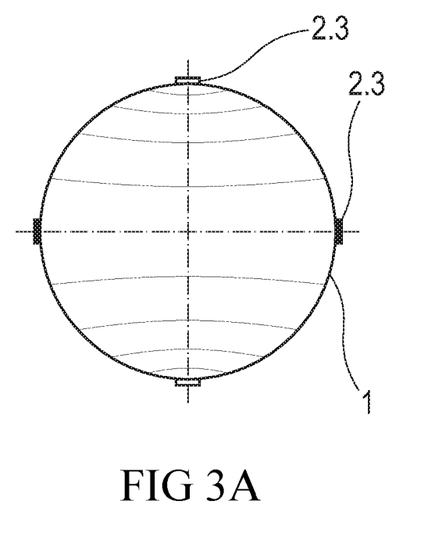
FIGS. 3A-3D show various advantageous distributions of the retaining lugs on the peripheral surface of the planar optical element.
Figure 3B:
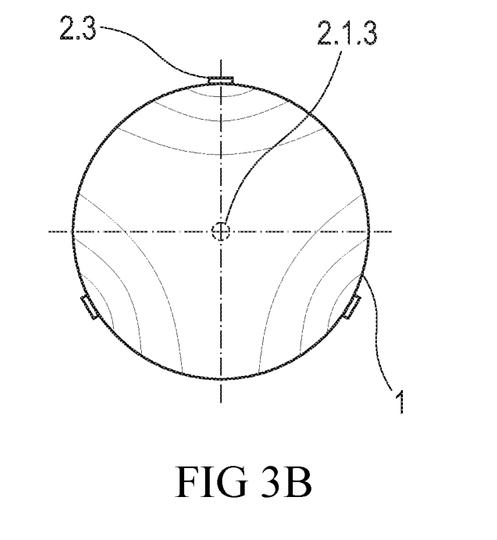
Figure 3C:
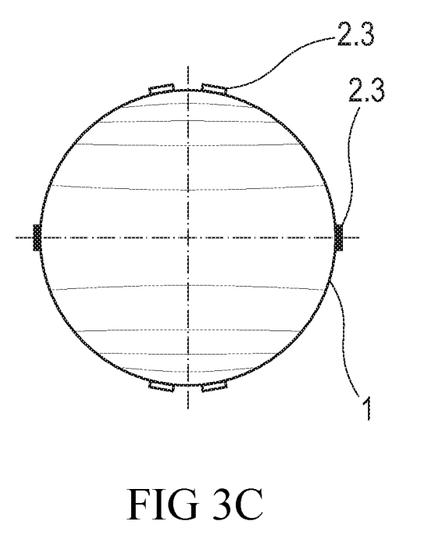
Figure 3D:
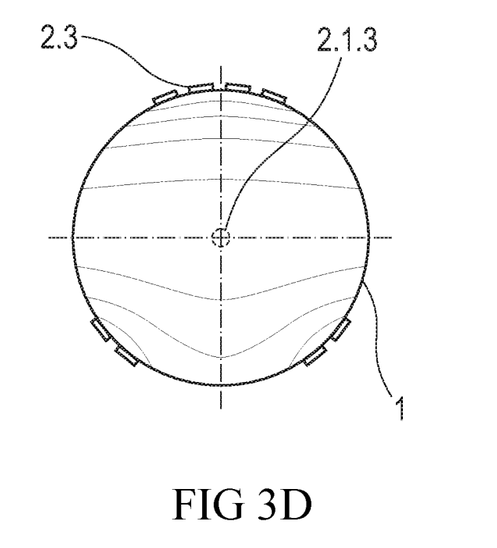
Figure 4A:
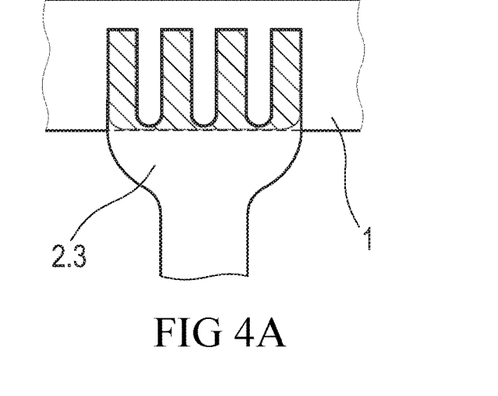
FIGS. 4A-4F: show various advantageous embodiments of the first end of the retaining lugs.
Figure 4B:
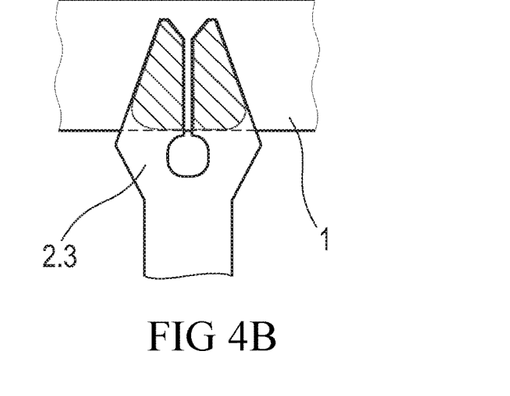
Figure 4C:
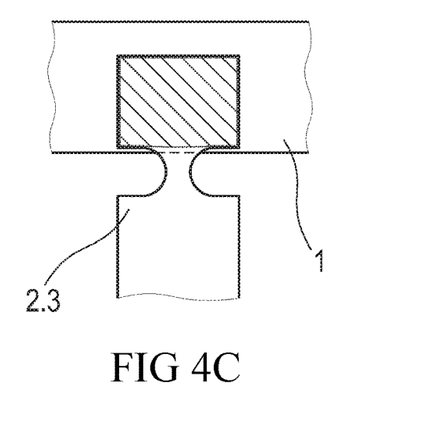
Figure 4D:
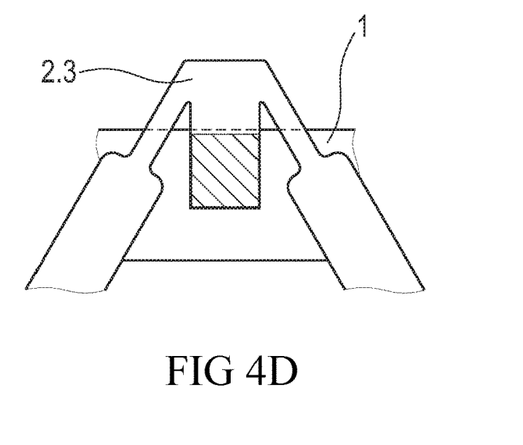
Figure 4E:
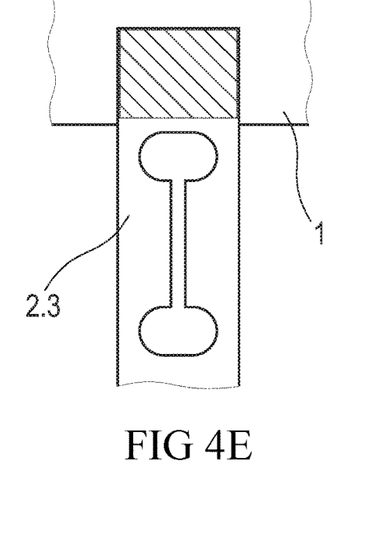
Figure 4F:
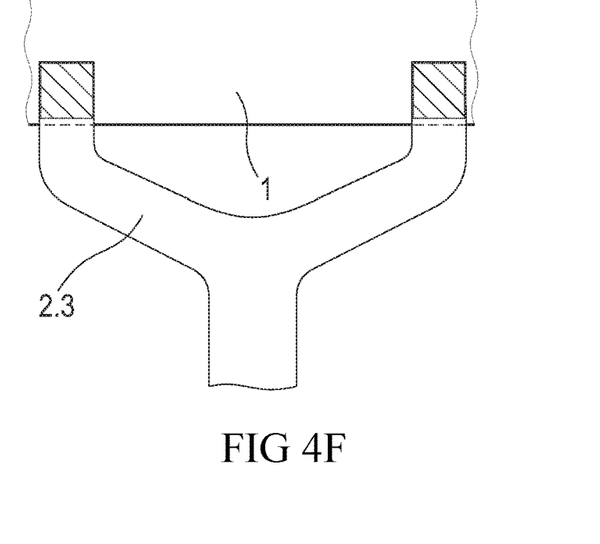

FIGS. 1A and 1B as well as FIGS. 2A and 2B schematically show two embodiments of a device for variably influencing the wavefront of a beam. They differ in that, in the embodiment of FIG. 1A, the device includes a mirror as a reflecting planar optical element 1, and in the embodiment of FIG. 2A, the device includes a planar plate as a transmitting planar optical element 1. The reflecting or the transmitting planar optical element 1 is actively deformed in the device, thereby actively influencing the wavefront of an impinging beam.

The planar optical element 1 has an axis of symmetry A, a front surface 1.1, a rear surface 1.2 and a cylindrical peripheral surface 1.3.

In addition to the planar optical element 1, the device comprises an actuating and holding means 2, which is arranged coaxially with respect to the planar optical element 1 and includes a support 2.1, a socket assembly 2.2 and at least three elastic retaining lugs 2.3. The support 2.1 and the socket assembly 2.2 have a common axis of symmetry B, which coincides with the axis of symmetry A of the planar optical element 1, and are firmly connected to each other. The connection may be established by a releasable connection, as shown, or by a non-releasable cohesive connection.

The support 2.1 comprises a first cylindrical peripheral surface 2.1.1 and a second peripheral surface 2.1.2. Between the first and the second cylindrical peripheral surfaces 2.1.1, 2.1.2, there is a recess 2.1.0 with respect to which the first and the second cylindrical peripheral surfaces 2.1.1, 2.1.2 are raised and whose width corresponds to a perpendicular distance a of the first and second cylindrical peripheral surfaces 2.1.1, 2.1.2 from each other. The diameter of the peripheral surface 1.3 of the planar optical element 1 and the diameter of the first and second cylindrical peripheral surfaces 2.1.1, 2.1.2 are equal.

Figure 1C:
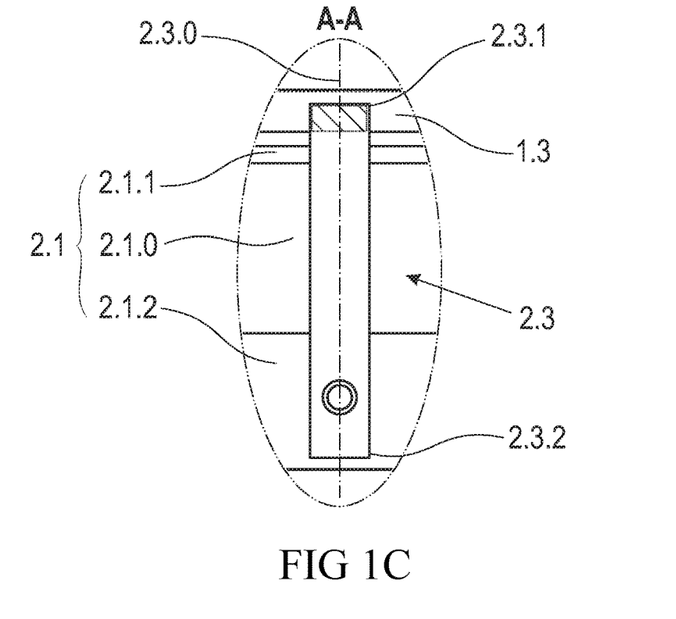
FIG. 1C shows a schematic diagram of a retaining lug.

As shown in FIG. 1C, the at least three elastic retaining lugs 2.3 each have a longitudinal axis 2.3.0, which is parallel to the joint axis of symmetry B, and they are firmly attached, respectively, to the peripheral surface 1.3 by a first end 2.3.1 and to the second cylindrical peripheral surface 2.1.2 by a second end 2.3.2. They each contact the first peripheral surface 2.1.1.

FIGS. 1A-1E and FIGS. 2A and 2B apply to all conceivable embodiments of the retaining lugs 2.3. The design of the retaining lugs 2.3, their arrangement and the nature of the connection to the peripheral surface 1.3 of the planar optical element 1 via the first end 2.3.1 as well as to the support 2.1 via the second end 2.3.2 are only shown here by way of example and may specifically deviate therefrom in multiple ways, as well as being combined with each other in whatever manner, as will be explained later.

The socket assembly 2.2 is arranged around the support 2.1 and firmly connected to the latter. Both parts may also be connected to each other monolithically.

Figure 1D:
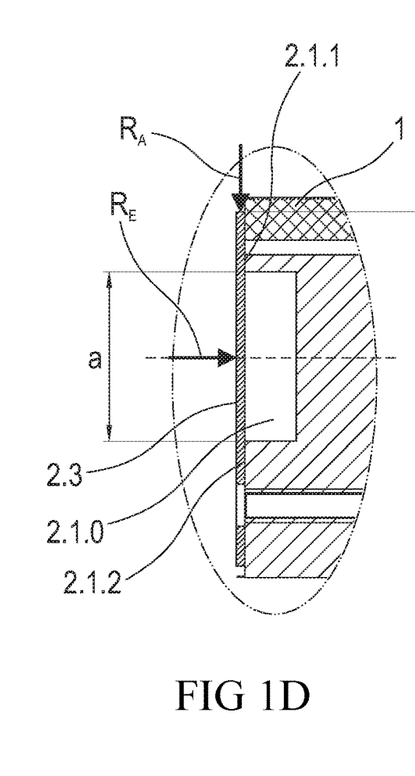
FIG. 1D shows a mounted retaining lug in a relaxed state.
Figure 1E:
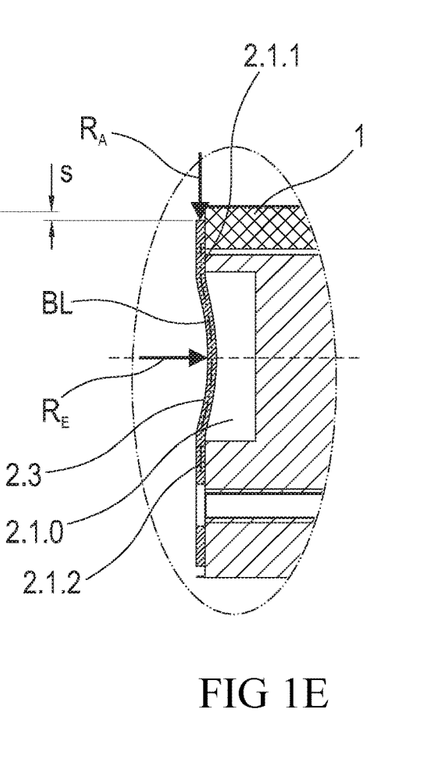
FIG. 1E shows a mounted retaining lug in a stressed state.

In the socket assembly 2.2, there is arranged at least one actuating element 2.4 which is assigned to one of the at least three elastic retaining lugs 2.3. The translational adjustment of the actuating element 2.4, which acts in a perpendicular direction on the surface of the retaining lug 2.3, causes the retaining lug 2.3 to be bent perpendicular to its longitudinal axis 2.3.0. This allows the retaining lug 2.3 to be both pre-stressed prior to mounting and increasingly relaxed after mounting for the purpose of deforming the planar optical element 1, as well as to be mounted stress-free and be relaxed after mounting in order to deform the planar optical element 1. FIG. 1D shows a stress-free retaining lug 2.3 and FIG. 1E shows a retaining lug 2.3 in a stressed state. If the retaining lug 2.3 is a simple leaf spring with a constant rectangular cross-section over its length, the actuating element 2.4 will preferably act on the retaining lug 2.3 centrally above the recess 2.1.0.

The actuating element 2.4 has a direction of action $R_E$, radial to the joint axis of symmetry B, along which an actuating force or a travel, respectively, is applied radially with respect to the joint axis of symmetry B into the retaining lug 2.3, so that the latter bends perpendicularly to its longitudinal axis 2.3.0. The retaining lug 2.3 does not bend over its entire length along the longitudinal axis 2.3.0 between the firm connections at the first end 2.3.1 and second end 2.3.2, but only over a length equal to the distance a, because it is unfree due to the contact with the first peripheral surface 2.1.1 in the direction of action $R_E$. A difference s between the length of a bending line BL forming for the retaining lug 2.3 above the distance a and the distance a corresponds to the distance by which the first end 2.3.1 of the retaining lug 2.3 is drawn toward the support 2.1 in the case of stress-free mounting, and a force relevant thereto acts on the peripheral surface 1.3 of the planar optical element 1 in a direction of action $R_A$. The direction of action $R_A$ is parallel to the axis of symmetry A of the planar optical element 1. In the case of pre-stress, the direction of action $R_E$ changes its directionality if the pre-stress is reduced by adjustment of the actuating element 2.4.

With respect to the foregoing description, the embodiments according to FIG. 1A and FIG. 2A do not differ.

If a mirror is advantageously used as the planar optical element 1, as shown in FIG. 1A, the rear surface 1.2, which has no optical effect, may be used otherwise. Accordingly, a raised supporting surface 2.1.3 is provided on the support 2.1 on which the planar optical element 1 is centrally supported by its rear surface 1.2 on the support 2.1, so that the latter forms an abutment for forces introduced via the retaining lugs 2.3. Advantageously, this allows all retaining lugs 2.3 to be used in order to apply the same forces or forces of different magnitudes into the planar optical element 1. Some or all of the retaining lugs 2.3 could be mounted stress-free or pre-stressed. If all retaining lugs 2.3 are mounted stress-free or under pre-stress, the forces applied into the retaining lugs 2.3 all have the same sign. Otherwise, forces may be applied in opposite directions into the retaining lugs 2.3 and, correspondingly, into the planar optical element 1. Retaining lugs 2.3 into which no forces are applied act as an additional abutment due to their stiffness in the direction of their longitudinal axis 2.3.0 which is not bent. Depending on how an expected deformation of the planar optical element 1 is to be possible, the retaining lugs 2.3 are mounted either in a pre-stressed or a relaxed condition, dimensioned and mounted on the peripheral surface 1.3 of the planar optical element 1 with respect to each other in number and arrangement.

If a transparent planar plate is advantageously used as the planar optical element 1, as shown in FIG. 2A, the support 2.1 has a breakthrough 2.1.4 which does not limit a beam guided through the planar plate. At least one of the retaining lugs 2.3 must then act as an abutment for forces introduced via other ones of the retaining lugs 2.3, so that the application of force via the other retaining lugs 2.3 does not turn into an axial displacement but causes bending of the planar optical element 1. Assigning an actuating element 2.4 to each of the retaining lugs 2.3 allows a choice to be made as to which of the retaining lugs 2.3 are used for force introduction and which of the retaining lugs 2.3 are used to act as an abutment, respectively. In this case, the retaining lugs 2.3 may also be mounted either stress-free or pre-stressed.

As shown in FIG. 2A, the transparent planar plate—which may also apply to a planar mirror—has a stepped edge region 1.4 extending circumferentially on both sides. This edge region 1.4 may also be formed on only one side. The transparent planar plate or planar mirror, respectively, thus has a reduced thickness along said stepped edge region 1.4, which increases its flexural sensitivity.

Advantageous embodiments of the arrangement of the retaining lugs 2.3 on the peripheral surface 1.3 of the planar optical element 1 are shown in FIGS. 3A-3D. They are preferably arranged individually or distributed in symmetrical pairs on the peripheral surface 1.3. The thin lines shown on the surface of the planar optical element 1 represent lines of the same height and are intended to show examples, by approximation, of the possibilities of differently bent surfaces as a function of the arrangement of the retaining lugs 2.3. The retaining lugs 2.3 represented in black here act as abutments, while the retaining lugs 2.3 shown in white serve to apply forces into the planar plate which all act in one direction, i.e. not in opposite directions, in the examples shown.

FIGS. 4A-4F show various advantageous embodiments of the first and second ends 2.3.1, 2.3.2 of the retaining lug 2.3. They differ, in particular, in their torsion resistance and their tangential elasticity as well as in the force distribution on the peripheral surface 1.3 of the planar optical element 1. The first end 2.3.1 is preferably glued to the peripheral surface 1.3 of the planar optical element 1.

The second end 2.3.2 of the retaining lugs 2.3 may also be mounted cohesively, but also e.g. in a force-fitting manner, between the support 2.1 and the socket assembly 2.2.

Moreover, the retaining lugs 2.3 are advantageously worked out of a sheet metal and connected in groups or all connected each other monolithically at their second ends 2.3.2.

As actuating elements 2.4, mechanical actuating elements, such as adjusting screws, or electromechanical actuating elements, such as piezo elements, may be used, by which a force is applied to a retaining lug 2.3 via a translational adjustment travel so as to stress said retaining lug 2.3 between its fixed first and second ends 2.3.1, 2.3.2.

Generally, conventional leaf springs with a constant rectangular cross-section over their length, such as those shown in FIGS. 1A and 1B, may be used as retaining lugs 2.3. However, they may also have other cross-sections over their length (not shown in the drawings), for instance varying in thickness or width along their length.

Figure 5:
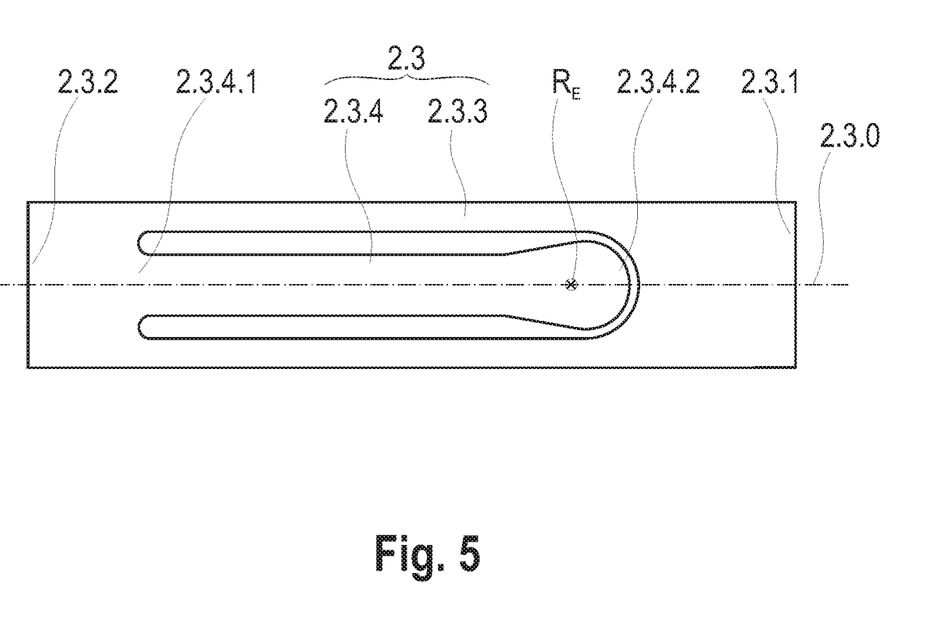
FIG. 5 shows a schematic diagram of a particularly advantageous embodiment of a retaining lug.
Figure 5A:
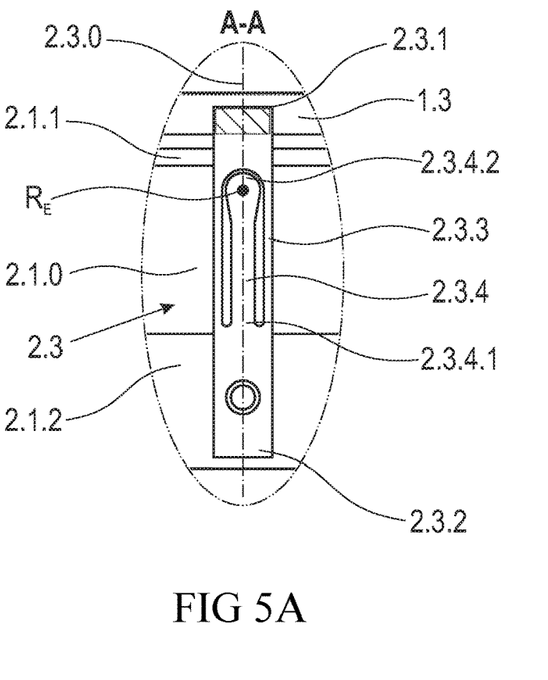
FIG. 5A shows a particularly advantageous embodiment of a retaining lug.
Figure 5B:
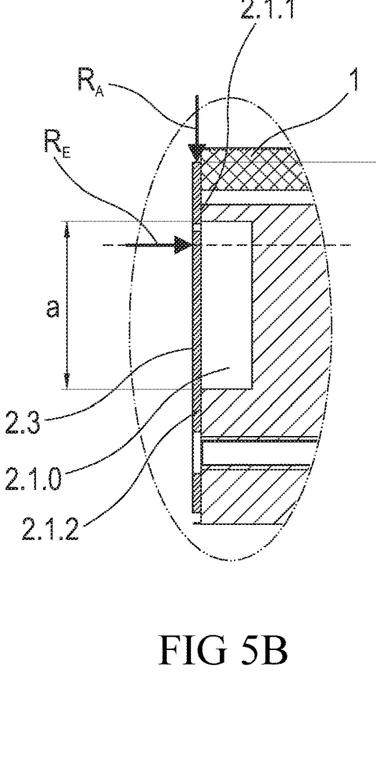
FIG. 5B shows a mounted retaining lug according to FIG. 5A in a relaxed state.
Figure 5C:
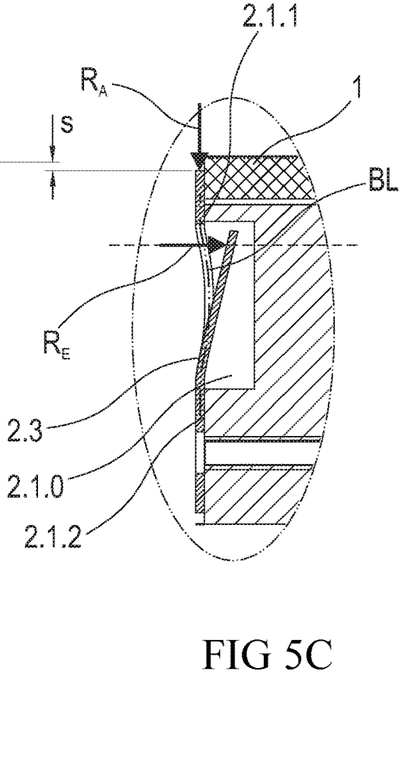
FIG. 5C shows a mounted retaining lug according to FIG. 5A in a stressed state.

A retaining lug 2.3 as shown in FIGS. 5A-5C and as described below is used as particularly advantageous.

This embodiment of the retaining lug 2.3 is divided by separation cuts and/or cutouts into a leaf spring frame 2.3.3 and a framed leaf spring tongue 2.3.4. Advantageously, the leaf spring frame 2.3.3 and the leaf spring tongue 2.3.4 are symmetrical with respect to the longitudinal axis 2.3.0.

The first end 2.3.1 and the second end 2.3.2 of the retaining lug 2.3 are formed on the leaf spring frame 2.3.3.

The leaf spring tongue 2.3.4 is monolithically connected to the leaf spring frame 2.3.3 by a fixed tongue end 2.3.4.1, which faces the first end 2.3.1 and is spaced apart from the latter. On the opposite side, the leaf spring tongue 2.3.4 has a free tongue end 2.3.4.2, which faces the second end 2.3.2. The actuating element 2.4 acts in its direction of action $R_E$ on the free tongue end 2.3.4.2. The retaining lug 2.3 contacts the first peripheral surface 2.1.1 by the leaf spring frame 2.3.3 and is pressed against it when a force is applied onto the retaining lug 2.3 via the actuating element 2.4, so that the second end 2.3.2 is guided in the direction of action $R_A$ of the planar optical element 1. The nested design of the leaf spring tongue 2.3.4 within the leaf spring frame 2.3.3 has the particular advantage for this embodiment of the retaining lug 2.3 that a desired transmission ratio between the applied adjustment travel of the actuating element 2.4 or a correspondingly introduced force, respectively, and the force acting on the peripheral surface 1.3 of the planar optical element 1 can be adjusted without having to adapt the external dimensions of the retaining lug 2.3 for this purpose.

LIST OF REFERENCE NUMERALS

1 planar optical element
1.1 front surface
1.2 rear surface
1.3 peripheral surface (of the planar optical element 1)
1.4 stepped edge region
2 actuating and holding means
2.1 support
2.1.0 recess
2.1.1 first peripheral surface
2.1.2 second peripheral surface
2.1.3 supporting surface
2.1.4 breakthrough
2.2 socket assembly
2.3 retaining lug
2.3.0 longitudinal axis
2.3.1 first end
2.3.2 second end
2.3.3 leaf spring frame
2.3.4 leaf spring tongue
2.3.4.1 fixed tongue end
2.3.4.2 free tongue end
2.4 actuating element
A axis of symmetry (of the planar optical element 1)
B joint axis of symmetry (of the support 2.1 and the socket assembly 2.2)
a distance
RE direction of action of the actuating element 2.4
RA direction of action of the retaining lugs 2.3 on the planar optical element 1
sdifference
BL bending line

What is claimed is:

1. A device for variably influencing a wavefront of a beam, the device comprising:
   a reflecting or transmitting planar optical element comprising a front surface, a rear surface, a cylindrical peripheral surface around an axis of symmetry (A), and an actuating and holding means arranged coaxially with respect to the planar optical element;
   the actuating and holding means comprising a support and a socket assembly with a joint axis of symmetry (B), and at least three elastic retaining lugs;
   the support comprising a first cylindrical peripheral surface and a second peripheral surface being spaced apart from each other at a perpendicular distance (a) and defining a recess, the first cylindrical peripheral surface and the second peripheral surface having a same diameter as the peripheral surface of the planar optical element;
   the socket assembly being disposed around the support and coupled to the support;
   the at least three elastic retaining lugs each having a longitudinal axis (2.3.0) parallel to the joint axis of symmetry (B), the at least three elastic retaining lugs being in contact with the first peripheral surface and being firmly attached by a first end to the peripheral surface of the planar optical element and by a second end to the second cylindrical peripheral surface, respectively; and
   at least one of the at least three elastic retaining lugs having an actuating element associated with it, the actuating element being arranged in the socket assembly and serving to bent the at least one of the at least three elastic retaining lugs over a length equal to the distance (a) perpendicular to its longitudinal axis.

2. The device for variably influencing the wavefront of a beam according to claim 1, wherein the planar optical element is a mirror, and wherein a raised supporting surface is provided on the support, the supporting surface serving to centrally support the planar optical element by the rear surface on the support, so that the support forms an abutment for forces introduced via the retaining lugs.

3. The device for variably influencing the wavefront of a beam according to claim 1, wherein the planar optical element is a transparent planar plate, and wherein the support has a breakthrough serving not to obstruct a beam guided through the planar plate, and wherein at least one of the at least three retaining lugs acts as an abutment for forces introduced via other ones of the retaining lugs.

4. The device for variably influencing the wavefront of a beam according to claim 1, wherein at least one of the at least three elastic retaining lugs is pre-stressed.

5. The device for variably influencing the wavefront of a beam according to claim 1, wherein the at least three elastic retaining lugs are disposed axially symmetrically to the joint axis of symmetry (B).

6. The device for variably influencing the wavefront of a beam according to claim 1, wherein the at least three retaining lugs are each divided by separation cuts and/or cutouts into a leaf spring frame and a framed leaf spring tongue, wherein the first end and the second end of the at least three retaining lug are formed on the leaf spring frame and the leaf spring frame contacts the first peripheral surface, the leaf spring tongue being monolithically connected to the leaf spring frame by a fixed tongue end facing the first end and being spaced apart from the first end, and wherein the associated actuating element acts on a free tongue end.

7. The device for variably influencing the wavefront of a beam according to claim 1, wherein the planar optical element comprises an edge region which is stepped on one or both sides.

* * * * *